United States Patent [19]

Tieckelmann

[11] Patent Number: 4,804,553

[45] Date of Patent: Feb. 14, 1989

[54] ALKALI METAL ACID PYROPHOSPHATE LEAVENING ACID COMPOSITIONS AND METHODS FOR PRODUCING THE SAME

[76] Inventor: Robert H. Tieckelmann, 2 Charles Pl., Ossining, N.Y. 10562

[21] Appl. No.: 909,156

[22] Filed: Sep. 19, 1986

[51] Int. Cl.$^4$ .............................................. A21D 10/04
[52] U.S. Cl. .................................. 426/551; 426/563; 426/653; 423/305
[58] Field of Search ............... 426/551, 563, 653; 423/305, 307

[56] References Cited

U.S. PATENT DOCUMENTS

| | | | |
|---|---|---|---|
| 1,834,747 | 12/1931 | Stokes et al. | |
| 2,408,258 | 9/1946 | Hetzel et al. | 23/106 |
| 2,532,281 | 12/1950 | Barch | 99/95 |
| 2,630,372 | 3/1953 | Wright, Jr. | 23/106 |
| 2,796,324 | 6/1957 | Bussell | 23/106 |
| 2,844,437 | 7/1958 | Kramer et al. | 23/106 |
| 2,870,017 | 1/1959 | Barch | 99/95 |
| 3,034,899 | 5/1962 | Tucker | 99/95 |
| 3,052,549 | 9/1962 | Kichline et al. | 99/95 |
| 4,230,730 | 10/1980 | Lauck | 426/128 |

FOREIGN PATENT DOCUMENTS 976803 10/1975 Canada ................................. 99/188

Primary Examiner—R. B. Penland

[57] ABSTRACT

The rate of reaction of alkali metal acid pyrophosphate leavening acids can be reduced significantly while still providing a leavening system which will proof by co-milling the alkali metal pyrophosphate with an oxide or hydroxide of an alkaline earth metal such as calcium or magnesium followed by heat treating to co-milled product. The combination of the co-milling and the heat treatment significantly reduces the rate of reaction of the alkali metal acid pyrophosphate leavening acid at room temperature.

The reaction rate can also be lowered by blending calcium hydroxide with a premilled SAPP which was heat treated in the absence of additional moisture subsequent to milling and prior to calcium hydroxide addition and subsequently heat treating the composition.

The leavening acid compositions of the invention find particular use inrefrigerated canned doughs.

22 Claims, 1 Drawing Sheet

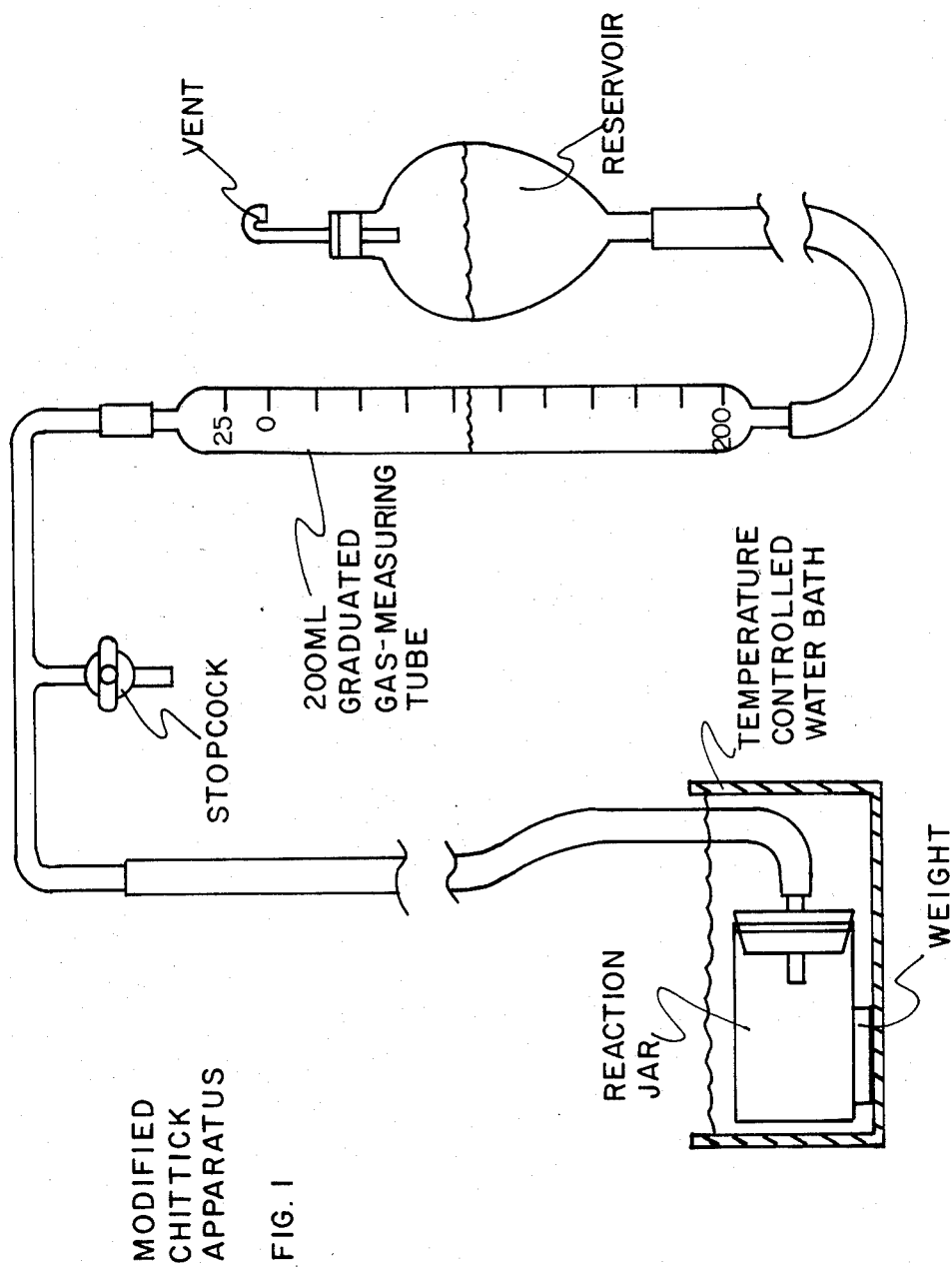

ALKALI METAL ACID PYROPHOSPHATE LEAVENING ACID COMPOSITIONS AND METHODS FOR PRODUCING THE SAME

The present invention relates to chemical leavening compositions and specifically those systems containing at least one alkali metal acid pyrophosphate and also to methods for producing such compositions.

Refrigerated canned doughs are generally compositions packaged in foil-surfaced fiber containers having vent holes or other means to allow gas to escape. As the dough is proofed in the container, carbon dioxide is generated from the leavening system which expands the dough in the container and drives out the oxygen. The expanded dough seals the container. An internal gas pressure is required to maintain the seal and keep oxygen out of the container. The gas pressure must remain after refrigeration to maintain the seal. Failure to maintain the pressure will cause the dough to spoil due to bacteriological action. The dough must generate a sufficient amount of gas pressure to maintain the seal and not cause the containers to rupture while retaining sufficient leavening to allow the product to rise when baked.

The leavening systems used in refrigerated canned doughs must develop gas at a sufficiently slow rate initially to allow for mixing and handling. If too much gas is released during mixing, not enough will remain for sealing the container (proofing). If a large amount of gas is generated after mixing but before the dough is placed in the can, the dough can puff causing problems in loading the proper dough weight into the container. After proofing, the containers must retain the internal pressure. Some leavening systems have been known not to maintain the pressure within the container upon refrigeration.

Sodium acid pyrophosphate (hereinafter SAPP) has been found to be especially well suited to the needs of preleavened package doughs and is widely used for that purpose.

Sodium acid pyrophosphate is usually prepared commercially in several grades by reacting phosphoric acid containing trace quantities of stabilizing additives, such as aluminum, calcium and potassium ions, as disclosed, for example, in U.S. Pat. Nos. 2,844,487 and 2,408,258 with a sodium base to produce monosodium orthophosphate which is then converted to sodium acid pyrophosphate by heating at a temperature of about 200°–245° C. The addition of minor amounts of potassium, calcium and aluminum ions to the SAPP during manufacture permits the controlled retardation of the rate of reaction of the SAPP with the sodium bicarbonate in the baking system.

After the conversion to sodium acid pyrophosphate is substantially (e.g. 94–96%) complete, the material is usually treated by either exposing it at elevated temperatures to an atmosphere containing steam at a partial pressure of about 100–760 millimeters of mercury for about ½ to 4 hours, or by reheating or continued heating at a temperature of about 200°–245° C. for prolonged periods, usually about 2 to 6 hours. Steam treatment is used primarily to promote stability in the inherently less stable fast-reacting grades of sodium acid pyrophosphate, whereas heat treatment is used to further depress the reaction rate of the slower reacting types.

Conversion and treatment of sodium acid pyrophosphate has been accomplished commercially by application of such conventional heating equipment as static heaters, rotary kilns, rotary flight heaters, drum dryers, rotary dryers and fluid bed reactors.

Sodium acid pyrophosphate is only sufficiently slow for use in preparing refrigerated doughs if a mixing temperature of about 18°–21° C. is maintained in the mixing bowl. This is accomplished by pumping a refrigerated liquid through a jacketed mixing bowl.

The rate of reaction between an alkali metal acid pyrophosphate leavening acid and a bicarbonate can be reduced when the baking compositions containing the alkali metal acid pyrophosphate contain small amounts of a material which furnishes calcium ions when it is dissolved in water, such as lime, and further reduced if a water-soluble alkali metal polyphosphate having a chain length greater than 8 is present (U.S. Pat. No. 3,052,549). The exact mode of rate retardation is not known though the calcium compound may affect the SAPP physically such as forming a coating. While the addition of lime does reduce the rate of reaction, the rate is sufficiently high as to continue to require the use of a jacketed apparatus to prevent undue gassing prior to packing of the biscuits in the container.

BRIEF SUMMARY OF THE INVENTION

In accordance with the present invention it has been found that the rate of reaction of alkali metal acid pyrophosphate leavening acids can be reduced significantly while still providing a leavening system which will proof, when required, and provide sufficient leavening to provide a final product of desirable characteristics. The invention is achieved by co-milling the alkali metal pyrophosphate with an oxide or hydroxide of an alkaline earth metal such as calcium or magnesium followed by heat treating the comilled product. The combination of the co-milling and the heat treatment significantly reduces the rate of reaction of the alkali metal acid pyrophosphate leavening acid at room temperature. Addition of the oxide or hydroxide after milling and no heat treatment, and addition during milling and no heat treatment do not provide significant reductions in the rate of reaction.

It was also noted that the reaction rate can be lowered by blending calcium hydroxide with a premilled SAPP which was heat treated in the absence of additional moisture subsequent to milling and prior to calcium hydroxide addition and subsequently heat treating the composition.

The leavening acid compositions of the invention find particular use in refrigerated canned doughs.

BRIEF DESCRIPTION OF THE DRAWING

FIG. 1 is a representation of an apparatus used to measure the volume of gas evolved from a dough during leavening.

DETAILED DESCRIPTION OF THE INVENTION

The alkali metal pyrophosphates (sodium and/or potassium) can be prepared as usual in the industry with the normal heat and/or steam treatments. As the preferred compound is sodium acid pyrophosphate, the reference to the same hereinafter is intended to include "alkali metal pyrophosphate". The acronym "SAPP" will be used to refer to sodium acid pyrophosphate.

The SAPP is blended with an oxide or hydroxide of an alkaline earth metal such as calcium or magnesium. The preferred composition is calcium hydroxide. As used hereinafter, the term "calcium hydroxide" will be used to include oxides or hydroxides of alkaline earth metals. The oxide or hydroxide is added to the SAPP as dry particles preferably having a particle size ranging from about 1 micron to about 50 microns and, preferably, an LOI of less than about 15%. The SAPP preferably has a particle size ranging from about 1 micron to about 100 microns and, preferably, an LOI of less than about 5%.

The SAPP and the alkaline earth metal oxide/hydroxide are co-milled or copulverized sufficient to induce a mechanochemical reaction between the materials. The milling is a reduction in particle size or alteration of the particle size distribution sufficient to cause the interaction between the materials milled. Any equipment which will induce, i.e. apply sufficient pressure to cause, the mechanochemical effect can be used such as a roller mill (preferred), ball mill, hammer mill, vibratory mill, grinding mill and the like.

The co-milling is carried out in the absence of water or fluids as the reaction is a powder to powder reaction. The pulverization or milling time can vary from apparatus to apparatus. Milling is sufficient to accomplish specified reduction in particle size and can run from about 0.25 to about 2 hours depending on the force applied. The milling can be carried out at room temperature or under heating or cooling as desired. The milling can be carried out in a single (preferred) step or multiple steps. The SAPP or the calcium hydroxide can be partially milled to reduce particle size prior to the addition of the other material.

The SAPP is used in a weight ratio to the calcium hydroxide ranging from about 10:1 to about 1000:1, and preferably from about 50:1 to about 500:1. The amount of hydroxide used must be sufficient to react with a majority of and preferably substantially all (at least 85%) of the acidic sites on the SAPP surface.

The co-milled SAPP/calcium hydroxide product is then thermally treated after milling even if the SAPP was thermally treated before milling. The thermal treatment is necessary to develop the unexpected low rates of reaction of the products of the invention.

The co-milled product can be thermally treated by heat alone in the absence of added moisture, steam (the term steam is used herein to cover steam with an additional heat source) and combinations of each. If the latter is used, it is preferred that the co-milled product be treated first with steam and then with heat in the absence of further moisture addition. The heating is conducted for a period of time and at a temperature sufficient to reduce the rate of reaction from that of a co-milled product containing calcium hydroxide without heat treatment. Preferably, the rate of reaction is reduced by at least about 50%. Alternatively, the rate of gas release is reduced to a level of from about 30 to about 15 milliliters per 30 minutes as measured by the procedure set forth in Example 1 using a Chittick burrette. Preferred heat treatment temperatures range from about 200° C. to about 250° C. and steam is used at a temperature of from about 200° C. to about 250° C. wherein the moisture content of the steam is sufficient to provide a condensate in the oven. The steam is used at a pressure ranging from about 1 to about 50 mm Hg of mercury. The heating apparatus can be of the same type used for SAPP conversion. Preferably the apparatus is designed to provide uniform heating and particle agitation to avoid hot spots.

Other ingredients such as tricalcium phosphate, alkali metal phosphate and food grade calcium salts of organic compounds can be included during milling or after milling though this is less desirable. The co-milled SAPP of the invention can be blended with ingredients normally used in combination with SAPP such as sodium bicarbonate to form such compositions as "baking powder", a dry chemical leavening composition.

The compositions of the present invention are effective in forming leavening acid compositions for baked goods. The leavening acid compositions of the invention can be used to leaven any baked product presently leavened by a chemical leavening agent. In particular, the leavening acid system of the invention can be used to replace the SAPP presently used in baking applications such as biscuits, donuts and the like. The gas-producing agent used in the formulation is generally sodium bicarbonate. The procedure for preparing the baked goods using the leavening acids of this invention are standard procedures normally connected with that product.

It is particularly effective to utilize the leavening composition of the present invention in canned, refrigerated biscuits which require a low gas generation during mixing and canning, the ability to develop pressure to seal the can upon proofing and the ability to maintain the pressure in the can under refrigeration. Biscuits are generally prepared from flour, sugar, salt, shortening, a leavening system of an alkaline bicarbonate and a leavening acid, water, and optionally milk solids. Additional components in minor amounts can include flavor and coloring agents, nutrient supplements, preservatives, antioxidants and reducing agents. In addition to the leavening acids of the present invention, small amounts of other leavening acids can be added to further provide for a wide range leavening activity. Illustrative acids suitable for such use include sodium aluminum phosphate, glucono delta lactone, anhydrous monocalcium phosphate, monocalcium phosphate monohydrate and the like. The products of the present invention can be formulated into baking powders and self-rising flour formulations which are well known in the art.

While it is desirable that the calcium for rate reduction and stabilization be provided by co-milling, the formulation for the baked product can contain any material which furnishes calcium ions when it is dissolved in water including water soluble calcium salts of inorganic acids, water soluble calcium salts of organic acids and calcium hydroxide. Calcium chloride can be used as a partial calcium source in the practice of the invention provided an appropriate neutral buffer such as sodium benzoate is used at the same time to maintain baking composition at about neutrality. Examples of water ionizable materials which contain calcium as one of their ions and which are relatively inexpensive and can be used without particular concern about buffers, taste, odor and the like are calcium hydroxide, calcium sulfate and calcium lactate.

Since the compositions of the present invention are generally intended for use in baking, all materials used in the preparation of these compositions should be food grade and should not strongly effect pH, taste or smell of the baked goods.

The present invention will be more fully illustrated in the Examples which follow:

EXAMPLE 1

The procedure of the invention was tested against several preparative variables to determine the effectiveness of these variables on performance results.

The monosodium phosphate (MSP) from which the SAPP was converted contained 0.14% aluminum, 0.24% calcium and 0.11% potassium by analysis. The MSp was converted to SAPP at 225° C. with and without steam. Milling and co-milling was conducted in a batch roller mill for 80 minutes. All calcium hydroxide additions were b 0.3% calcium hydroxide based on the weight of the SAPP. Calcium hydroxide addition after milling (Final Add'n. in Table I) was conducted by solid-solid admixing in a Patterson-Kelley Twin Shell dry blender for 30 minutes. All thermal treatments were at 225° C. The heat and steam treatments were for 20 minutes each. The steam/heat treatments were 10 minutes steam and 10 minutes heat only treatment.

The samples of this Example were evaluated for the rate at which $CO_2$ gas is evolved from a sodium acid pyrophosphate-sodium bicarbonate reaction in a dough medium. A standard dough containing the test SAPP is prepared in a Farinograph mixing bowl. The dough is then transferred to a modified Chittick apparatus as shown in FIG. 1 and the volume of gas evolved is measured over specific time intervals.

290.8 grams of hard wheat biscuit flour were placed in a Farinograph mixing bowl and the mixer activated. The Farinograph water bath temperature was 16° C. and the speed was 63 rpm. While mixing, a solution contining 168.2 grams of water and 5.0 milliliters of calcium chloride solution (0.75 grams $CaCl_2$ with 99.25 grams distilled water) at 22° C. was added quickly (over a 5 second period). Upon the completion of the water addition, the interior walls of the Farinograph bowl were scraped down. Mixing was continued for 5 minutes.

Over a 5 second period, a previously blended leavening premix comprising 6.1 grams of sodium bicarbonate, 1.9 grams of potassium chloride, 4.5 grams of sodium chloride, 16.0 grams of dextrose and 8.3 grams of the SAPP composition being tested was added to the center of the Farinograph bowl and mixing was continued for 3 minutes. Immediately after addition of the leavening premix, the interior walls of the Farinograph bowl were scraped down to insure proper mixing.

After turning off the mixer, a 200 gram sample of dough was cut and placed into a wide mouth reaction jar of the Chittick apparatus, the jar was stoppered, connected to the apparatus and then submerged in a water bath maintained at 21° C., the stop cock set at open. Dough temperature is critical for the test and should be within ±0.8° C.

At exactly 5 minutes from the end of the dough mixing or 8 minutes after addition of the leavening premix, the reservoir of the Chittick apparatus was adjusted to read 0 on the graduated gas measuring tube, the stop cock was closed and the reservoir lowered so that the liquid level in the reservoir was about 2 inches below that in the gas measuring tube.

The volume of gas evolved from the dough sample was measured at 10, 30 and 60 minutes by raising the reservoir to line up its liquid level with the liquid level in the gas measuring tube. After each reading, the reservoir liquid level was lowered about 2 inches below the liquid level in the gas measuring tube.

The following results were obtained:

TABLE I

COMPARISON OF DIFFERENT Ca(OH)₂ ADDITION METHODS DURING PREPARATION OF SAPP

| Method of Ca(OH)₂ Addition | | | Thermal Treatment | | | | Chittick Results* Ml of CO₂ | |
|---|---|---|---|---|---|---|---|---|
| Mill W | Mill W/O | Final Add'n. | Heat | Steam | Steam/Heat | None | Sample | Results |
| X |   |   | X |   |   |   | 1 (13) | 15 (18) |
| X |   |   |   | X |   |   | 2 (14) | 15 (22) |
| X |   |   |   |   | X |   | 3 (15) | 13 (16) |
| X |   |   |   |   |   | X | 4 (16) | 36 (47) |
| X |   | X | X |   |   |   | 5 (17) | 32 (30) |
| X |   | X |   | X |   |   | 6 (18) | 43 (41) |
| X |   | X |   |   | X |   | 7 (19) | 36 (38) |
| X |   | X |   |   |   | X | 8 (20) | 38 (35) |
|   | X |   | X |   |   |   | 9 (21) | 22 (19) |
|   | X |   |   | X |   |   | 10 (22) | 31 (36) |
|   | X |   |   |   | X |   | 11 (23) | 28 (37) |
|   | X |   |   |   |   | X | 12 (24) | 31 (38) |

*Sample No. 1–12 - SAPP prepared without steam at 225° C.
Sample No. 13–24 - SAPP prepared with steam at 225° C.
Sample number in parenthesis corresponds to results in parenthesis.

As can be seen from the results in Table I, SAPP prepared in accordance with the invention (samples 1–3 and 13–15) provide significantly lower gas release indicating a significant improvement in stability in dough.

Samples from Table I were subjected to an accelerated aging test. All samples selected were placed in a dessicator and subjected to a 75% relative humidity at 60° C. for the period of time specified in the results. The stability of the compositions was measured by their ability to generate gas as measured by the Chittick test. The following results were obtained:

TABLE II

SAPP STABILITY STUDY

| Sample | Result of Chittick Test After Humidification Treatment* | | |
|---|---|---|---|
|  | 0 Hr. | 1.5 Hr. | 5.0 Hr. |
| Anhydrously Converted SAPP Milled with Ca(OH)₂ (Nos. 1–4) | | | |
| 1 Heat Treatment | 15 | 24 | 31 |
| 2 Steam Treatment | 15 | 25 | 29 |
| 3 Steam/Heat Treatment | 13 | 26 | 36 |
| 4 No Heat Treatment | 36 | 34 | 47 |
| 9 Mill, Heat Treatment Add Ca(OH)₂ | 22 | 31 | 35 |
| Mill, Heat Treatment Add Ca(OH)₂ and Heat | 17 | 24 | 35 |
| 5 Mill, Heat Treatment No Ca(OH)₂ | 32 | 32 | 108 |
| Steam Converted SAPP | | | |
| 2 Mill with Ca(OH)₂, Steam | 22 | 26 | 43 |
| 21 Mill, Heat Treatment Add Ca(OH)₂ | 19 | 24 | 34 |
| 17 Mill, Heat Treatment No Ca(OH)₂ | 30 | 37 | 189 |

*Milliliters of gas evolved.

SAPP for refrigerated biscuits preferably provides from about 15 to about ±milliliters of $CO_2$ released after 0.5 hours. The compositions of the invention provide products with such limits. The performance results after 1.5 hours of humidification do not effectively differentiate samples. However, prolonged exposure to humidity does show the beneficial effect of adding co-milling with calcium hydroxide. Thus, samples 17 and 5 do not meet the above specification.

The addition of calcium hydroxide to milled SAPP without thermal treatment, to milled SAPP thermally treated with steam, or thermal treatment with steam and then heat after milling but before calcium hydroxide addition, provided Chittick gas releases of 31 (38), 31 (36) and 28 (37) milliliters respectively (the numbers in parenthesis relate to SAPP converted with steam). While milled SAPP with a post-milling heat treatment with calcium hydroxide added after milling in the absence of moisture showed 22 (19) milliliters of gas released, subsequent thermal treatment of that product showed a further reduction in the gas released to 17 milliliters.

What is claimed is:

1. A method for preparing alkali metal acid pyrophosphate having a reduced rate of reaction comprising:
   a. co-milling alkali metal acid pyrophosphate with an alkaline earth metal oxide, hydroxide or mixtures thereof; and
   b. heat treating the co-milled product at a temperature and for a time sufficient to reduce the rate of reaction of said alkali metal acid pyrophosphate.

2. The method as recited in claim 1 wherein the co-milling is for a time sufficient to induce a reaction between said pyrophosphate and said oxide or hydroxide.

3. The method as recited in claim 1 wherein the heating is at a temperature and for a time sufficient to reduce the rate of reaction at least 20%.

4. The method as recited in claim 1 wherein the alkali metal acid pyrophosphate is sodium acid pyrophosphate.

5. The method as recited in claim 4 wherein the alkaline earth metal oxide or hydroxide is calcium hydroxide and is used in a ratio to said sodium acid pyrophosphate ranging from about 1:10 to about 1:1000.

6. The product of the process of claim 5.

7. The method as recited in claim 1 wherein the alkaline earth metal oxide or hydroxide is selected from the group consisting or calcium oxide, calcium hydroxide, magnesium oxide, magnesium hydroxide and mixtures thereof.

8. The method as recited in claim 1 wherein the alkaline earth metal oxide or hydroxide is calcium hydroxide.

9. The method as recited in claim 1 wherein the alkaline earth metal oxide or hydroxide is used in a ratio to the alkali metal acid pyrophosphate ranging from about 1:10 to about 1:1000.

10. The method as recited in claim 1 wherein the comilled product is heat treated by heating in the absence of moisture, heating in the presence of moisture and a combination thereof.

11. The method as recited in claim 1 wherein the heat treatment is at a temperature ranging from about 200° C. to about 250° C. for a period of time ranging from about 0.25 to about 2 hours.

12. The product of the process of claim 1.

13. A method for preparing chemically leavened baked goods which comprises leavening the baked goods with a leavening system comprising an alkaline bicarbonate and the product of claim 1.

14. A method for preparing an alkali metal acid pyrophosphate having a reduced rate of reaction comprising:
   (a) milling an alkali metal acid pyrophosphate to a particle size ranging from about 1 micron to about 100 microns;
   (b) thermally treating the milled product with heat at a temperature within the range of from about 200° C. to about 250° C. in the absence of added moisture;
   (c) blending the milled heat treated pyrophosphate with an alkaline earth metal oxide, hydroxide or mixtures thereof; and
   (d) thermally treating the product of step (c) at a temperature within the range of from about 200° C. to about 250° C.

15. The method as recited in claim 14 wherein the alkali metal acid pyrophosphate is sodium acid pyrophosphate.

16. The method as recited in claim 15 wherein the alkaline earth metal oxide or hydroxide is calcium hydroxide and is used in a ratio to said sodium acid pyrophosphate ranging from about 1:10 to about 1:1000.

17. The product of the process of claim 16.

18. The method as recited in claim 14 wherein the alkaline earth metal oxide of hydroxide is selected from the group consisting of calcium oxide, calcium hydroxide, magnesium oxide, magnesium hydroxide and mixtures thereof.

19. The method as recited in claim 14 wherein the alkaline earth metal oxide or hydroxide is calcium hydroxide.

20. The method as recited in claim 14 wherein the alkaline earth metal oxide or hydroxide is used in a ratio to the alkali metal acid pyrophosphate ranging from about 1:10 to about 1:1000.

21. The product of the process of claim 14.

22. Bakery products using as a leavening acid an alkali metal acid pyrophosphate of reduced reaction rate formed by:
   (a) co-milling an alkali metal acid pyrophosphate with an alkaline earth metal oxide, hydroxide or mixture thereof; and
   (b) heat treating the co-milled product at a temperature and for a time sufficient to reduce the rate of reaction of the alkali metal acid pyrophosphate.

* * * * *